Sept. 7, 1943.  E. J. SWEETLAND  2,328,858
PARKING APPARATUS AND TICKET STAMPING MEANS
Filed May 27, 1940  3 Sheets-Sheet 1
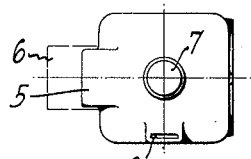
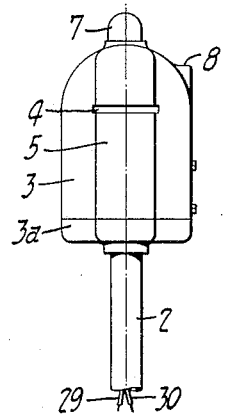
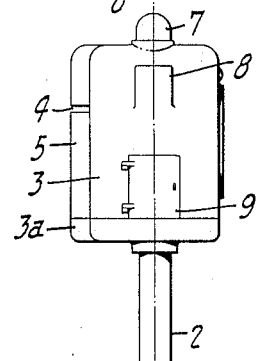
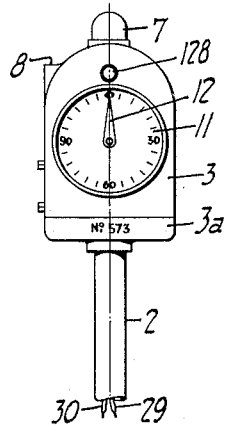
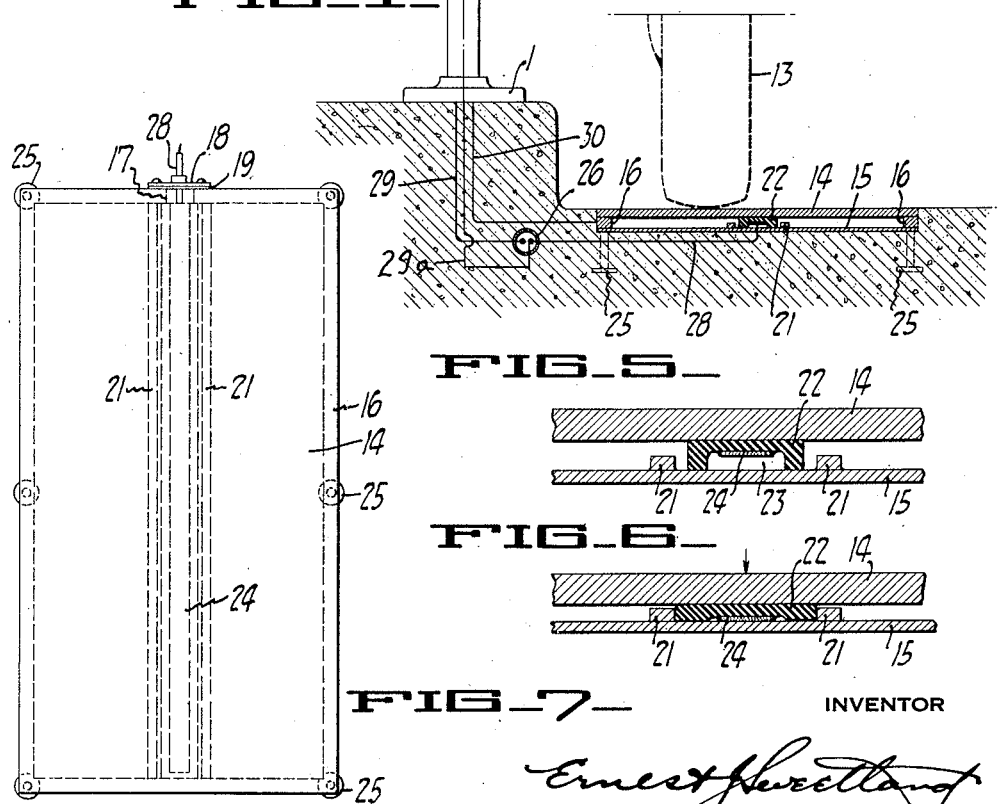
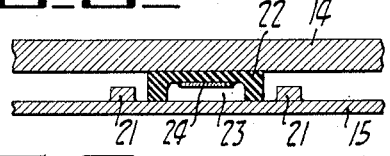
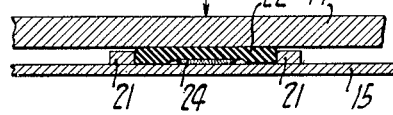
INVENTOR
Ernest Sweetland Sept. 7, 1943. E. J. SWEETLAND 2,328,858
PARKING APPARATUS AND TICKET STAMPING MEANS
Filed May 27, 1940 3 Sheets-Sheet 2
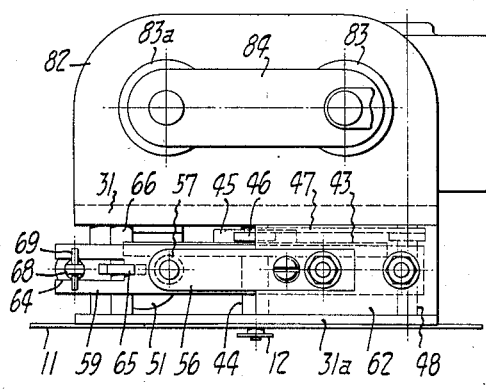
FIG_10_
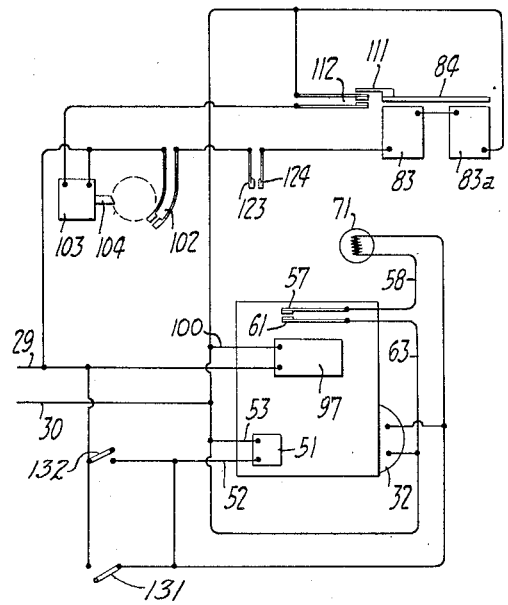
FIG_10A_
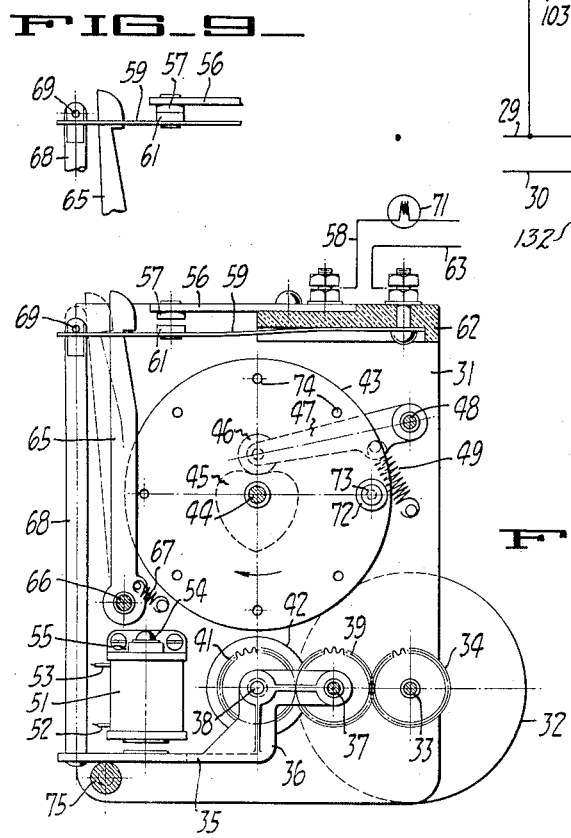
FIG_9_
FIG_8_
INVENTOR
Ernest J. Sweetland Sept. 7, 1943.  E. J. SWEETLAND  2,328,858
PARKING APPARATUS AND TICKET STAMPING MEANS
Filed May 27, 1940  3 Sheets-Sheet 3
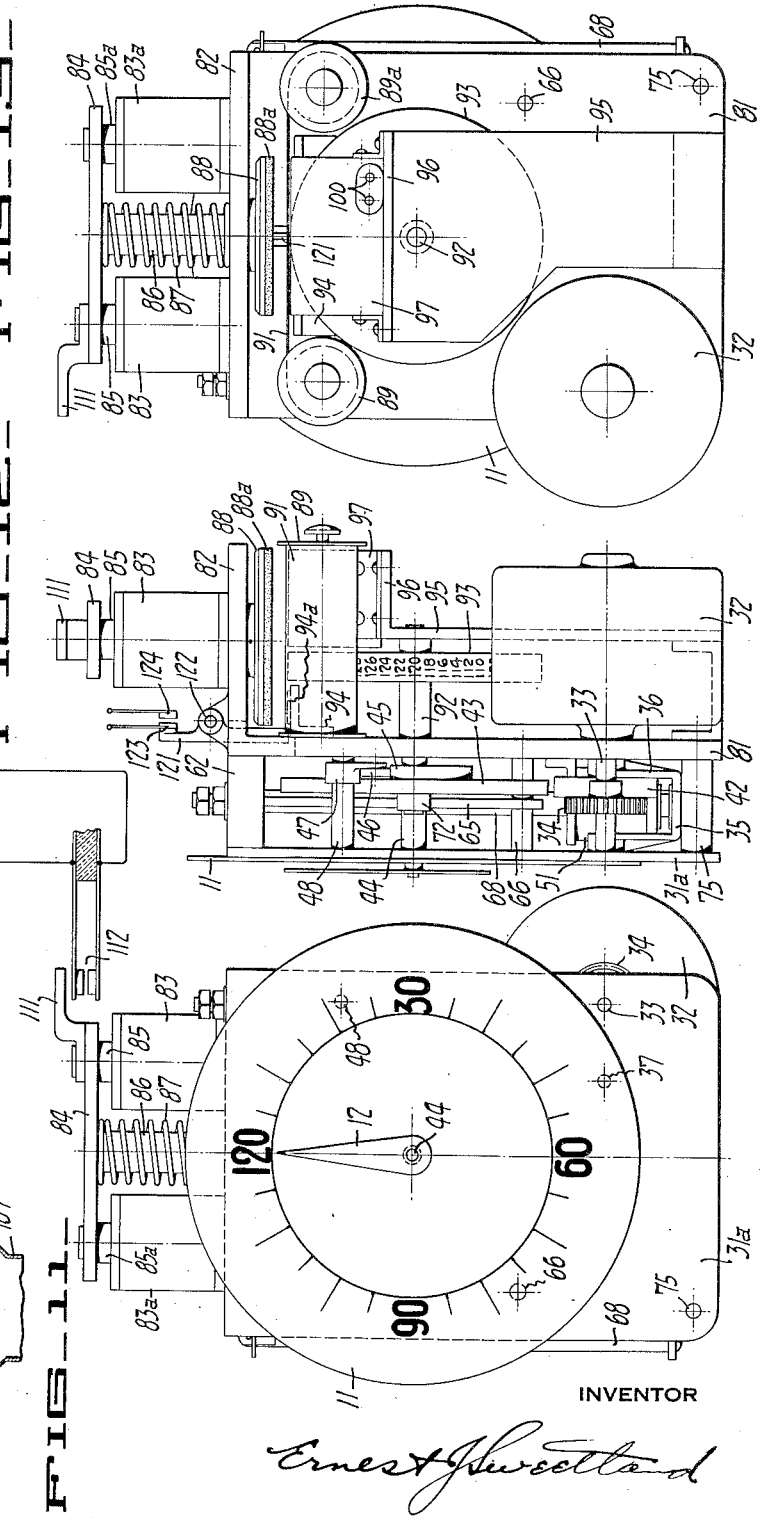
INVENTOR
Ernest J. Sweetland Patented Sept. 7, 1943

2,328,858

UNITED STATES PATENT OFFICE 2,328,858

PARKING APPARATUS AND TICKET STAMPING MEANS

Ernest J. Sweetland, Piedmont, Calif.

Application May 27, 1940, Serial No. 337,534

1 Claim. (Cl. 234—57)

This invention relates to an apparatus for the control of automobile parking and particularly to an apparatus designed to receive a coin or token in payment of a charge or a fine to be collected for parking, or for over-parking, on a city street.

An object of the invention is to provide in combination, means for measuring the duration of parking and means for receiving a charge for parking, or a fine for over-parking, and means for issuing documentary evidence of the payment of such charge or fine.

A further object of the invention is to provide an apparatus for receiving a coin or token in payment of a charge or fine for parking or over-parking, such means being arranged and constructed that the apparatus will mark a ticket in evidence of the payment only while the vehicle is still in parking position.

Another object is to provide a weather-proof switch plate for parking timers and a novel flexible switch strip for same.

Another object is to provide an apparatus adapted to receive coins or tokens in payment of service and to issue a receipt therefor, the mechanism being so arranged that the marking means for issuing said receipt is operative only when a card or ticket is inserted in said machine to a pre-determined position.

The invention possesses other objects and advantageous features, some of which with the foregoing, will be set forth in the following description where I shall outline in full that form of my invention which I have selected for illustration in the drawings accompanying and forming part of the present specification. I do not limit myself to such form or forms of my invention herein illustrated and described, since the invention is capable of various modifications which are limited only by the scope of the appended claim.

Referring to the drawings:

Figure 1 shows a side elevation of the apparatus together with a sectional view of a portion of the curb and gutter of a city street, showing the switch plate and part of a wheel of an automobile in parked position.

Figure 2 shows a front elevation of the apparatus with a fragmentary view of the support for same.

Figure 3 is a rear view of the apparatus shown in Figures 1 and 2.

Figure 4 is a plan view of the housing of the apparatus.

Figure 5 is an enlarged sectional view of a portion of the switch plate illustrated in Figure 1 when said switch is in open position.

Figure 6 is a view showing the same parts as Figure 5 when contacts of the switch are closed by the pressure of a vehicle on the switch plate.

Figure 7 is a plan view of the switch plate which is shown in partial section in Figures 1, 5 and 6.

Figure 8 is a front elevation, with front cover plate removed, of one form of timing apparatus that may be used in my invention.

Figure 9 is a fragmentary view of the upper left hand corner of the apparatus of Figure 8, showing the position of the switch and attendant parts when the switch is in closed position.

Figure 10 is a plan view showing parts of the apparatus shown in Figure 8.

Figure 10—A is a wiring diagram.

Figure 11 is a front elevation of a form of the apparatus.

Figure 12 is a side elevation of the apparatus of Fig. 11.

Figure 13 is a rear view of the apparatus shown in Figures 11 and 12.

Figure 14 shows a portion of the coin slot with coin contacting and release mechanism.

Figure 15 shows a typical imprint made on a parking ticket.

Referring in detail to Figures 1, 2, 3 and 4, the numeral 1 represents a base portion fixed securely to the curb. Into this base is secured the hollow upright standard 2 which serves both as a support and a conduit for the wires which lead into the instrument. 3 is a casing which is secured to the base plate 3a by any convenient means. 4 is a slot for the entrance of the ticket to be stamped or otherwise marked. This slot, it will be noted, extends across the projecting extension 5 on the back of the instrument. 6 represents a card or ticket in position in the slot 4 to be stamped or otherwise marked. For convenience in description I shall use the term "mark" or "marked" when referring to the impression to be made on a ticket by the apparatus. The word "mark" or "marked" in this application is to be construed in its broadest sense, as the principles of my invention as herein described may be used to mark the card or ticket in many different ways, such as by the use of a rubber stamp, embossing type, a punch or series of punches, a mark produced by a chemical composition, or any other means that will produce evidence upon the ticket that the parking charge or fine has been paid.

7 is a transparent dome on the top of the housing through which a red light is exhibited when a vehicle is over-parked. 8 is the coin slot and 9 a door to a coin pocket into which the coins dropped in the slot 8 are deposited. The front of the instrument is provided with dial 11 and indicator hand 12. The dial 11 is graduated as shown. In this instance the dial is divided into 120 minutes as indicated by the numerals. I prefer that the dial be graduated in minutes but the method of graduation and the rate of rotation of the hand 12 may be varied to suit conditions. In this instance the hand makes one revolution in two hours but if desired the gear ratio of the clock motor may be changed to give the hand any desired rate of rotation, as for instance, one revolution in four hours, in which case the dial would be graduated so that each quarter of the circle represents 60 minutes. In practice the dial would be divided preferably in 5 minute intervals.

An automobile wheel 13 is represented as resting upon the switch plate 14 which performs an important function and will therefore be described in detail. The upper portion of the switch plate 14 is a steel plate preferably provided with a non-skid surface. This plate may vary in thickness but I prefer a thickness of at least one-eighth of an inch, and I may use a thickness of $\frac{3}{16}$ inch to a quarter inch. Underneath plate 14 and of substantially identical size is the steel plate 15 which may be of somewhat thinner material than plate 14. I have found $\frac{3}{32}$ inch thickness of the plate 15 to give excellent results. Following the outline of the plate 14 and welded thereto are the spacing members 16. These are preferably about one quarter inch in height so that when they are welded in place the two plates form a hollow cell with a space of approximately one quarter inch between. The cell between the plates is entirely enclosed to form a waterproof structure with the exception of a small opening 17 which is provided with cover plate 18 which, with the aid of the gasket 19 forms a water-tight closure for the switch plate. This cover plate 18 is detachably secured by screws and is provided with an aperture through which an insulated wire may pass, or to which a metal protecting conduit may be connected. Inside of the switch plate is a pair of metal guides 21 which are spot-welded at intervals to the lower plate. These serve as a guide to keep the rubber switch strip 22 from shifting its position between the plates. This switch strip is novel in construction and is made with an open channel throughout its length as shown at 23 in Figure 5 and along the channel is a flexible braided wire conductor 24 which is vulcanized into the rubber strip. By using a flat wire braid for this purpose I obtain a strip that is flexible and therefore not subject to injury in handling, and the interstices of the wire braid provide an excellent anchorage for the rubber, so the braid and rubber are very firmly bonded together in a construction that is simple and inexpensive to manufacture and very durable. The strip 22 is made of a rubber composition of medium softness and flexibility. Other materials may be used for the purpose such as neoprene, or other synthetic rubbers or rubber substitutes, if desired. Figure 5 shows the normal position of the switch strip 22 when there is no weight upon the switch plate and Figure 6 shows the approximate condition of the switch strip when a vehicle is resting on the switch plate. In Figure 6 it will be noted that the metallic braid 24 is in contact with the lower plate 15, which is grounded, and this closes the circuit to set the timing mechanism in operation; the switch strip forming one side of the circuit and the other being grounded to the switch plate. The switch plate may be of the order of 1½ to 2 feet in width and from 4 to 6 feet in length and it is preferably imbedded in the road bed as shown in Figure 1 and held in place by the bonding of cement or asphaltic material surrounding the plate in addition to the anchorage furnished by bolts welded to the lower corners of the plate as shown at 25. I prefer to use a relatively rigid plate 14 for the upper surface of the switch plate, not only because it is more rugged to withstand the wear of traffic but because the weight of a vehicle transmitted to the plate through the wheel 13 is distributed over a considerable area and therefore a plate of considerable width may be served by one or two switch strips 22. For the sake of simplicity I have shown but one switch strip in the switch plate, but a plurality may be used at spaced intervals; or a wide strip of rubber, suitably ribbed and carrying a plurality of conductors 24 may be used if desired. The resiliency of the rubber and the depth of the channel 23 is preferably made such that while the switch strip is readily flattened out by the weight of a car, to bring the conductor 24 in contact with the lower plate 15, the weight of the average person walking over the plate does not effect a contact.

26 is an underground conduit to carry the electric wires and the wiring connections are diagrammatically shown by the wire 28 which is assumed to connect one side of the power circuit with the terminal wire forming connection with the conductor 24, and the wire 29 leads into the instrument and back through the wire 30 which is grounded to the switch plate. Referring to the timing mechanism in detail and particularly to Figure 8 the front cover plate of which is removed to show the interior construction, 31 is the back plate of the timing unit and 32 is a back-geared synchronous motor, the shaft 33 of which is keyed to the gear wheel 34. 35 is an iron bar which serves as an armature and is provided with a pair of upwardly extending side plates 36 which form bearings for the shafts 37 and 38. Only one of the side plates 36 is visible in the drawings. The shaft 37 extends through the side plates 31 and 31a to form a pivotal mounting for the armature 35 and its attendant parts. The gear wheel 39 is an idler and is consequently free to rotate on the shaft 37. Gear 41 and the friction drive wheel 42 are both secured to the shaft 38 which is free to rotate in the side plates 36. Since shaft 37 has bearings in side plates 31 and 31a, and since the shorter shaft 38 does not extend beyond side plates 36, the armature 35 is free to move up and down about the axis formed by shaft 37. The wheel 43 is secured to the shaft 44 which is rotatably mounted in holes in the plates 31 and 31a. The heart cam 45 is fixed to the shaft 44 and by means of the roller 46 on the cam follower arm 47 causes the wheel 43 to return to the starting position whenever the rim of the wheel 43 is free of engagement with the friction wheel 42. The follower arm 47 is pivotally mounted at 48 and the roller 46 is kept in constant contact with the cam 45 by means of the tension spring 49. 51 is an electro-magnet which has terminal connections 52 and 53; it is held in position by the screw 54 by means of which it is attached to the bracket 55 which in turn is secured to the side plate 31.

Mounted at the top of the timing unit is a switch, the upper leaf of which, 56, is comparatively rigid and is provided with the contact point 57; the leaf 56 is connected with the wire 58. The lower leaf 59 carries the contact point 61 and is comparatively flexible. 62 is a block of insulating material to form a base for the switch and the wire 63 connects with the leaf 59. As will be noted in Figure 10 the lower switch leaf 59 is provided with the notch 64 at its outer end and the leaf 56 is somewhat shorter. The upright latch member 65 is pivotally mounted at 66 and is urged toward the right by the tension spring 67. An upright bar 68 is rigidly mounted by riveting or otherwise to the armature 35 and at its upper extremity is provided with the cross bar 69. 71 is the signal light which gives notice when a vehicle is overparked. This is caused to turn on and off by the action of the switch leaf 59.

The wheel 43 is provided with roller 72 which rotates about the central shaft 73. The holes 74 are located in the wheel 43 at known intervals and are for use in the event it is desired to change the parking limit which may be done by shifting the roller 72 and shaft 73 to different positions with respect to the location of the heart cam 45. The use of the roller 72 is to push the latch 65 out of engagement with the leaf 59 and cause the points 57 and 61 to make contact. 12 is the indicator hand of the timing mechanism (see also Figure 2).

In the fragmentary view, Figure 9, the positions of latch 65, post 68, cross bar 69 and switch leaf 59 are shown when the switch points are in contact.

The timing mechanism above described operates in the following manner: When a vehicle runs onto the switch plate and closes contact between the conductor 24 and the plate 15 this causes the current to flow through the solenoid 51 thus causing the armature 35 to be raised and magnetically held against the face of the electromagnet 51. This causes the friction drive wheel 42, the face of which is preferably of rubber or other resilient material to bear against the peripheral face of the wheel 43. The closing of the vehicle-actuated switch also starts the motor 32 in operation causing shaft 33 and gear 34 and the attendant train of gears and wheels to rotate. Since the motor 32 is of the synchronous type it maintains a constant speed and the gearing within the motor and the train of gears driven thereby and the diameter of wheel 42 are selected so as to give the shaft 44, the hand 12 and the wheel 43 the correct timing. In this instance we will assume that the speed of the motor and the gearing is so arranged as to cause the hand 12 to rotate at one revolution in two hours. As soon as the magnet lifts the armature 35 the wheel 42 engages the rim of wheel 43 causing same to rotate in the direction indicated by the arrow and since the hand 12 is carried by the shaft 44 the hand rotates to indicate the duration of parking time on the dial. In this instance, we will assume that the legal parking limit is one hour. Therefore when the wheel 43 has made one-half of a revolution the roller 72 engages the latch 65 pushing it to the dotted position, releasing the switch leaf 59, which then closes contact between the switch points 57 and 61 causing the lamp 71 to light and this shows as a red light through the dome 7 of Figure 2. As long as the car remains parked the red light continues to show, and the hand 12 continues to rotate, and an officer can tell by the reading of the dial just how long a vehicle has remained in parked position. When a car moves off of the contact plate the electro-magnet 51 releases the armature 35 which drops and comes to rest against the post 75. When this occurs the downward motion of the cross bar 69 engages the end of the leaf 59 and opens the switch causing the light 71 to go out. At the same time the spring 67 urges the latch 65 forward into position to engage the leaf 59 and hold the points 57 and 61 apart until the post 68 lifts again in response to the next closing of the vehicle-actuated switch. When the armature 35 is released by the magnet, the wheel 42 disengages from the wheel 43. Then the roller 46, which is held against the face of the cam 45, causes the wheel 43 and the hand 12 to return to the starting position in readiness for the next operation. The mechanism described down to this point is in part set forth in my United States Patent No. 2,121,179 issued June 21, 1938 but such description as has been herein repeated is necessary to a clear understanding of the descriptions which follow and which embody entirely new and novel subject matter.

The foregoing description relates to the mechanism for timing the duration of parking and for displaying a signal light when the legal parking limit has been exceeded. It is customary in cities which have parking regulations for the traffic officers to issue a ticket to overparked cars which ticket usually calls for the appearance in court of the offending driver and payment of a fine. It is one of the objects of this invention to provide means not only to time the parking of vehicles but to provide a convenient means whereby the fine or charge for overparking may be collected without causing the driver great inconvenience and with a minimum of expense to the city government. This is to be accomplished by providing means in connection with the parking timer for receiving a coin or token in payment of the fine and of issuing a receipt therefor. In carrying out my invention it is presupposed that the ticket secured to the car for overparking shall be in the form of a business reply card which does not require the payment of postage by the sender but the postage on which is paid by the receiver. Such a card would be printed with an address of the proper city office on one side and on the reverse side would be instructions to the driver concerning the payment of the fine and the operation of the parking control machine. The card would be adapted to fit in the machine and would contain a blank space to receive the stamp imprinted thereon by the automatic mechanism about to be described.

Referring to Figures 11 to 14 inclusive, 31a represents the plate described in previous figures, 12 the time indicating hand and 32 the motor which has the drive shaft 33. The mechanism of Figure 11 contains all of the parts described in connection with Figures 8, 9 and 10 with the exception of the back plate 31 which is supplanted by the rigid plate 81 the upper portion of which is turned at right angles to form the supporting shelf 82 as shown in Figure 12. The wheel 43, roller 72, heart cam 45, roller 46, drive wheel 42 and shaft 44 are shown in Figure 12 as a means of identifying the parts of the structure, other parts being omitted. Upon the shelf 82 is mounted a pair of solenoids 83 and 83a. The yoke 84 carries the armatures 85 and 85a which enter into the cores of the magnetic coils in the usual manner. A vertical rod 86 is fixed to the yoke 84 and is surrounded by the compression spring 87 which returns the yoke and attendant parts to the position shown after each operation of the stamp. At the lower end of the rod 86 is the platen 88, the face of which is padded with rubber or felt 88a. A pair of rollers 89 and 89a carry the inked ribbon 91. A suitable mechanism not shown, is provided to gradually feed the inked ribbon from one roller to the other as the apparatus is used.

Referring to Figure 12 it will be noted that the shaft 44 of the timing mechanism is provided with the extension shaft 92 and upon this shaft is fixed the wheel 93 upon which are embossed figures representing minutes of time, which correspond to the figures on the dial 11, but the figures on dial or printing wheel 93 indicate more frequent intervals. On the back of the plate 81 is a bracket 94 upon the top of which at 94a are secured embossed letters bearing the words indicated at the top of the facsimile marking shown in Figure 15. The back plate of the machine 95 is turned at right angles at the top to provide the shelf 96 and on top of this shelf is mounted the casing 97 which contains an electrical time stamp and dating unit which is in constant operation and is driven by a self-contained electric motor which receives power through wires connected at 100 which receive energy from wires 29 and 29a Fig. 1. The specific construction of this timing and dating stamp does not form a part of the present invention but as any well known type of apparatus may be adapted to the purpose it is represented diagrammatically. It is sufficient for present purposes to point out that the upper surface of the time stamping unit 97 is provided with either embossed revolving wheels or hands capable of printing time-indicating characters upon a card or ticket with the aid of the inked ribbon 91 when the card is pressed down by the platen 88.

In Figure 14 is illustrated a coin slot 8 and switch mechanism 102 and solenoid 103 which actuates the coin release plunger 104. The spring 105 serves to return the plunger to normal position when the solenoid 103 is de-energized, the stop 106 serving to locate the plunger in its true position. 107 is a coin chute to receive the coin 108 when it is released by the mechanism. While I have shown a simple conventional coin slot at 8, it should be understood that I may use any of the well known devices for preventing the entrance into the slot of improper objects or unsuitable coins. The operation of the stamping mechanism will be understood from the following description and reference to the wiring diagram shown in Figure 10A which also shows the electrical hook-up for the entire system.

To carry out the objects of the invention it is important that the stamping device be not allowed to function unless the ticket to be stamped is properly placed between the platen 88a and the inked ribbon 91. I therefore provide the lever 121 which is pivotally mounted on the pin 122. The lower portion of this lever is accommodated by a slot at the angle of the plate 81 and 82 which permits the lever 121 a certain amount of movement. The upper end of this lever engages the switch leaf 123 the resiliency of which normally holds the lever in the position shown but when a card or ticket is inserted between the platen 88a and the ribbon 91 and pushed into the slot as far as it will go, it causes the point on switch leaf 123 to make contact with the switch point 124 thereby closing the circuit which must be closed before the solenoids 83 and 83a can function. The operator therefore may drop the coin in the slot 8 and then insert the card until it pushes the lever 121 to the limit of motion, whereupon the switch leaves 123 and 124 make contact and the impression is properly made on the ticket. If it were not for lever 121 and its attendant parts the operator might fail to obtain a receipt for payment; or he might drop the coin when the card was in position to receive only a part of the stamp.

Assuming that the motorist has received a ticket for over-parking he takes the ticket, in accordance with directions thereon, and inserts it as far as it will go in the slot 4 shown in Figures 1, 3 and 4. He then drops the required coin, say twenty-five cents, in the coin slot 8. This brings the points of switch 102 in contact with each other thus closing the circuit through the solenoids 83 and 83a. This causes the platen 88 and pad 88a to come down forcibly against the back of the ticket whereby the embossed figures on the wheel 93, the inscription on the embossed pad 94a and the time record of the mechanism 97 are stamped upon the ticket. As soon as the yoke 84 has reached the end of its stroke the arm 11 engages the switch 112 causing contact to be closed in the circuit through the solenoid 103. This action instantly retracts the member 104 to the dotted position causing the coin 108 to drop in the chute 107 whence it is delivered into the coin pocket of the machine (not shown). As soon as the coin 108 drops, the switch 108 immediately opens whereupon the spring 87 returns the yoke 84 and its attendant parts to the position shown in the drawings thus releasing the card and leaving the apparatus ready for another operation. A typical representation and inscription that would be made on the card is represented in Figure 15. A suitable counting mechanism would naturally be provided to accumulatively record the number of coins collected by each machine.

Throughout this application I have used the terms "ticket" and "card" interchangeably and the objects of the invention may be carried out by the necessary receipt, or indication of payment being stamped or imprinted upon any object suitable for the purpose. Stamping means has been illustrated and described as the means of issuing a receipt for payment but it is obvious that the purposes of the invention may be carried out in other ways. If it is desired to avoid the expense and complication of providing the time recording stamp 97 a simple die may be substituted in its place in which event the platen 88 and pad 88a would be omitted and a punch to fit the die would be suitably mounted in the lower end of the rod 86 whereby the downward vertical motion of rod 86 would force the punch through the parking ticket or similar object into the die substituted in place of the stamp 97. If this method is used, the punch and die employed would naturally be of special design not readily imitated. By this means the punch mark in the ticket would bear evidence of payment. If it is desired to further simplify the apparatus by the omission of the embossed wheel 93, this may also be done and the important purpose of my invention; namely, of issuing a receipt for a parking fine or fee, prompt collection of which is insured by wiring the apparatus so that it is inoperative except while the vehicle is still resting on the vehicle-actuated switch, can still be carried out.

The principles herein set forth are capable of many useful modifications within the spirit of my invention. For instance, the rather elaborate method of stamping the ticket may be simplified by using a simple rubber stamp worded in the form of a receipt, in which case the stamp would preferably include also the identifying number and location of the instrument issuing the receipt.

In the wiring diagram, Fig. 10A, the switch 131 may represent the vehicle actuated switch and 132 may represent a special switch located in or near the apparatus for shunting out the vehicle actuated switch for any special purpose. Or, for certain special uses it may be desirable to substitute a coin actuated switch in place of the vehicle actuated switch. In this case the coin actuated switch would be used to operate the timing mechanism for a predetermined length of time while the switch 102 would be used only for the payment of a fine or fee in excess of the original fee deposited in such coin operated switch.

It is within the scope of my invention to arrange a plurality of time indicators, representing different parking berths, in a group in a single casing containing a single coin controlled stamping, or marking, device which would serve the several units. Or, a plurality of stamping units, each representing a coin of different value, may be arranged in a group.

I claim:

A parking timer comprising a timing mechanism including indicator means to indicate the lapse of time a vehicle has been parked; a graduated figured wheel for printing a parking time period corresponding with the period indicated by said indicator means; driving means connecting said indicator means and said figured wheel with said timing mechanism; guiding means to present the surface of a card to the part of said figured wheel at which the figures on said wheel correspond with the figures indicated by said indicator; means to cause said card surface and said figured wheel to approach each other to cause an impression from said wheel to be made on said card; printing means adjacent said figured wheel having a character to designate the location of said parking timer, arranged and constructed so that an impression of the character indicating the location of said parking timer and the duration of parking may be simultaneously made on said card.

ERNEST J. SWEETLAND.